Patented Sept. 16, 1947

2,427,582

UNITED STATES PATENT OFFICE 2,427,582

BETA (ACYLTHIO) ALDEHYDES AND KETONES AND THEIR PREPARATION

William H. Vinton, Wilmington, Del., assignor to E. I. du Pont de Nemours & Company, Wilmington, Del., a corporation of Delaware No Drawing. Application September 27, 1944, Serial No. 556,093

4 Claims. (Cl. 260—455)

This invention relates to new compositions of matter and to a method for their preparation.

This invention has as an object the provision of new (acylthio) carbonyl compounds. A further object is to provide new beta (acylthio) carbonyl compounds. A still further object is to provide new beta (acylthio) aldehydes. Still another object is the provision of a process for obtaining said compounds. Additional objects will become apparent from an examination of the following description and claims.

These and other objects and advantages are accomplished according to the herein described invention which broadly comprises admixing at a temperature below 100° C. a carbonyl compound containing as the sole carbon-to-carbon unsaturation at least one ethylenic linkage, with at least one mol of a monocarbothiolic acid per ethylenic double bond in said carbonyl compound, and thereafter maintaining the resultant reaction mixture at a temperature within the range of from 30° C. to 100° C., and isolating the (acylthio)-carbonyl compound thereby produced.

A preferred embodiment of this invention comprises adding dropwise with stirring to an alpha, beta-unsaturated aldehyde containing only one ethylenic double bond as the sole carbon-to-carbon unsaturation at a temperature below 0° C., an aliphatic monocarbothiolic acid containing piperidine in an amount within the range of from 0.005% to 0.1%, based on the total weight of the reactants, at least one mol of said acid being added per mol of said aldehyde, the temperature of the reaction mixture being maintained below 100° C. during said addition, and thereafter heating the reaction mixture to a temperature within the range of from 30° C. to 100° C. for from two to ten hours, and recovering the beta (acylthio) aldehyde thereby produced.

By the expression, "carbonyl compound containing as the sole carbon-to-carbon unsaturation at least one ethylenic linkage" as used herein and in the appended claims is meant an organic compound of the group consisting of aldehydes and ketones, free from —C≡C— triple bonds, which contains at least one —C=C— double bond which is not present in a benzene nucleus, i. e., at least one ethylenic double bond.

By the expression "alpha, beta-unsaturated carbonyl compound" is meant a carbonyl compound, i. e., an aldehyde or ketone, in which the carbonyl group is joined directly by a single bond to a carbon atom which is in turn joined by an ethylenic double bond to another carbon atom.

By "monocarbothiolic acid" as used herein and in the claims is meant an acid of the general formula R—COSH, in which R is an alkyl, haloalkyl, alkoxy or aryl group.

The following examples, in which proportions are in parts by weight unless otherwise specified, are given for illustrative purposes and are not intended to place any restrictions on the herein described invention.

Example I

Fifty-six parts of freshly distilled acrolein is placed in a flask fitted with a condenser, thermometer, dropping funnel, and stirrer. The material is chilled to —20° C., and 76 parts of ethanethiolic acid (i. e. thioacetic acid) containing 0.2 part of piperidine is added dropwise with stirring during the course of 30 min., i. e. the mol ratio of acrolein to ethanethiolic acid is 1/1. The temperature is maintained at 40° C. by occasional cooling. The reaction mixture is warmed for 2 hours at 40° C. after the addition is complete. The crude reaction mixture is fractionated under nitrogen in a precision still giving 78 parts (60% of the theoretical yield) of pure beta (acetylthio) propionaldehyde, boiling at 89° C./11 mm.; having a refractive index ($n_D^{25}$) of 1.4837. The product shows the following analytical values. Calculated for $C_5H_8O_2S$: carbon 45.5%, hydrogen 6.06%, sulfur 24.2%; found: carbon 45.39%; hydrogen 6.53%; sulfur 24.11%.

The beta(acetylthio) propionaldehyde is a clear liquid characterized by a sharp, mildly unpleasant, clinging odor, and is soluble in the common organic solvents but insoluble in water. It forms a crystalline 2,4-dinitrophenylhydrazone (M. P. 126–127° C.) and a crystalline bisulfite addition compound.

Example II

Thirty-five parts of freshly distilled alphamethylacrolein is chilled to —30° C. in a flask fitted with a condenser, thermometer, dropping funnel and stirrer. Thirty-eight parts of ethanethiolic acid is added dropwise with stirring followed by 0.1 part of piperidine. The temperature rises rapidly to 50° C. where it is maintained by cooling.

When the reaction appears complete, the mixture is warmed for 2 hours at 40–45° C. and it is then fractionated under nitrogen in a precision still after removal of volatile constituents at room temperature with a water pump. There are obtained 68.7 parts (94% of the theoretical yield) of pure alpha-methyl-beta-(acetylthio) propionaldehyde, boiling at 65° C./2 mm. and having a refractive index ($n_D^{25}$) of 1.4831. The product is a clear liquid with a sharp fruity odor, and is soluble in the common organic solvents, but insoluble in water. Analysis of the material shows it to contain 48.9% carbon, 7.16% hydrogen, and 22% sulfur as compared for the calculated values for $C_6H_{10}O_2S$ of 49.4% carbon, 6.85% hydrogen and 21.9% sulfur. It forms a crystalline 2,4-dinitrophenylhydrazone (M. P. 130–131° C.) and a crystalline bisulfite addition compound.

Example III

Ninety-eight parts of freshly distilled mesityl oxide and 76 parts of ethanethiolic acid were placed in a still pot and allowed to react without cooling. The temperature rose slowly to 55° C. and then began to fall back. An aliquot portion was titrated with iodine and showed that 80% of the ethanethiolic acid had reacted. The mixture was then heated for 10 hours on a steam bath after which time less than 8% of the ethanethiolic acid remained unreacted. The product was fractionated in a precision still under nitrogen. After removal of a forerun (21 parts), the bulk of the remainder (112 parts) distilled at 66–67° C. at 1 mm. The material had a refractive index ($n_D^{25}$) of 1.4748. The product shows the following analytical values. Calculated for $C_8H_{14}O_2S$: carbon 55.1%; hydrogen 8.05%; sulfur 18.4%; found: carbon 55.54%; hydrogen 8.44%; sulfur 18.1%.

Example IV

Sixty-seven parts of 2-ethyl-2-hexenal and 40 parts of ethanethiolic acid were placed in a still pot and allowed to react. The temperature rose slowly to 40° C. then after 30 minutes began to fall back. An iodine titration on an aliquot portion was only 40% complete. After 10 hours heating on a steam bath, 90% of the ethanethiolic acid had reacted. The product was distilled through a precision column and after a small forerun 56 parts of a limpid liquid boiling from 75–77° C. at 1 mm. was obtained. It has a refractive index ($n_D^{25}$) of 1.4767. The product shows the following analytical values. Calculated for $C_{10}H_{18}O_2S$; carbon 59.5%; hydrogen 8.90%; sulfur 15.8%; found: carbon 60.11%; hydrogen 9.04%; sulfur 15.5%.

The process of this invention is generically applicable to all carbonyl compounds which are free from triple bonds and which contain at least one ethylenic double bond. Particularly useful in the process of this invention are carbonyl compounds which contain as the sole carbon-to-carbon unsaturation an ethylenic double bond which is in the alpha, beta-position with respect to the carbonyl group. Included among specific examples of carbonyl compounds that may be used are the aliphatic aldehydes and ketones, such as crotonaldehyde, citronaldehyde, 2-methyl-2-pentenal, 4-octadecenal, alpha-propylacrolein, alpha-isobutylacrolein, alpha-amylacrolein, 2-hexenal, rhodinal, methyl vinyl ketone, phorone, tiglic aldehyde, geranial, citronellal, cyclohexenone, allylacetone, 7-methyl-5-hepten-2-one, diallyl acetone, pseudo-ionone, sorbic ethyl ketone and the like.

In place of ethanethiolic acid there can be used other monocarbothiolic acids, such as propanethiolic, hexanethiolic, decanethiolic, octanethiolic, octadecane thiolic, chloroethanethiolic acid, methoxyethanethiolic acid, alpha-toluenecarbothiolic acid, thiolbenzoic acid and the like.

Thus, from ethanethiolic acid and crotonaldehyde there is obtained beta(acetylthio) butyraldehyde, from propanethiolic acid and geranial there is obtained 3,7-dimethyl-3,7-bis(propanoylthio)octanal, from chloroethanethiolic acid and 9-octadecenal there is obtained 10-(chloroacetylthio)octadecanal, from hexanethiolic acid and methyl vinyl ketone, there is obtained 4-(hexanoylthio)butanone and from thiolbenzoic acid and 2-hexenal there is obtained 3-(benzoylthio)hexanal.

The process is generally carried out in the absence of a solvent or diluent, but if desired, such solvents and diluents can be used. Examples of suitable materials which can be used include cyclohexane, isooctane, diethyl ether, etc.

While a carbonyl compound containing as the sole carbon-to-carbon unsaturation at least one ethylenic linkage may be reacted with an aliphatic monocarbothiolic acid in accordance with this invention in the absence of a catalyst to provide an (acylthio)carbonyl compound, substantially improved results are had when said reaction is effected in the presence of from 0.005% to 0.1%, based on the total weight of the reactants, of an organic nitrogenous base as catalyst. Said catalyst not only brings the reaction to conclusion in considerably less time but it also aids in preventing interaction of the acid with the carbonyl group. Included among examples of organic nitrogenous bases useful in the process of this invention are: quaternary ammonium hydroxides, e. g., tetramethylammonium hydroxide, tetraethylammonium hydroxide; organic amines, e. g., trimethyl amine, methyl amine, dimethyl amine; guanidine; nitrogen-containing heterocyclic organic bases, e g., piperidine, pyrrolidine, pyridine and the like.

It is essential that the aliphatic monocarbothiolic acid should be admixed with the carbonyl compound in an amount corresponding to at least one mol of said acid per ethylenic double bond present in said carbonyl compound, i. e., when the carbonyl compound contains but one ethylenic double bond, the mol ratio of acid to carbonyl compound must be at least 1/1, and when the carbonyl compound contains $n$ ethylenic double bonds ($n$ being a positive integer greater than 1), the mol ratio of acid to carbonyl compound must be at least $n/1$. If desired, larger proportions of aliphatic monocarbothiolic acid may be employed, but this is not essential.

For best results, the unsaturated carbonyl compound is cooled to a temperature of below 0° C. and the aliphatic monocarbothiolic acid, admixed with the catalyst, e. g., piperidine, is added thereto. Improved products are obtained by this procedure since the reaction is exothermic and loss of carbonyl compound through conversion to polymer is thereby minimized. The rate of addition of the aliphatic monocarbothiolic acid/catalyst mixture to the unsaturated carbonyl compound and the degree of cooling of the resultant mixture must be adjusted so that the final temperature of said mixture is below 100° C. Thereafter as has been stated hereinbefore, the mixture is heated to a temperature within the range of from 30° to 100° C., preferably for a period of about two hours. The resultant (acylthio)carbonyl compound is then isolated, as by fractional distillation.

Although, as pointed out above, it is preferred to add the acid containing the catalyst to the unsaturated carbonyl compound, the reverse procedure can be used although this may result in undesired interaction between the carbothiolic acid and the carbonyl group.

The process of this invention provides an easy means for preparing (acylthio)carbonyl compounds, i. e. (acylthio)aldehydes and ketones. It is especially well adapted for the preparation of (acylthio)aldehydes which are useful for subsequent conversion to sulfur-containing amino acids.

As many apparently widely different embodiments of this invention may be made without departing from the spirit and scope thereof, it is to be understood that I do not limit myself to the specific embodiments thereof except as defined in the appended claims.

Having described the present invention, the following is claimed as new and useful:

1. A process for obtaining a beta(acylthio)aldehyde which comprises providing an alpha, beta-unsaturated aldehyde, containing only one ethylenic double bond as the sole carbon-to-carbon unsaturation, at a temperature below 0° C., and adding thereto dropwise with stirring, an aliphatic (monocarbothiolic)acid containing piperidine in an amount within the range of from 0.005% to 0.1% calculated on the basis of the total weight of said aldehyde and said acid, at least one mol of said acid being added per mol of said aldehyde, the temperature of the reaction mixture being maintained below 100° C. during said addition, and thereafter heating the reaction mixture to a temperature within the range of from 30° to 100° C. for a period of from two to ten hours, and isolating the beta(acylthio)aldehyde thereby produced.

2. The process according to claim 1, wherein the aldehyde is acrolein, the acid is ethanethiolic acid, and the resultant product is beta(acetylthio)propionaldehyde.

3. The process according to claim 1, wherein the aldehyde is alpha-methylacrolein, the acid is ethanethiolic acid and the resulting product is alpha-methyl-beta-(acetylthio)propionaldehyde.

4. A process for obtaining a beta (acylthio) oxo compound which comprises admixing at a temperature below 100° C. an aliphatic compound, whose sole functional groups are an oxo group and ethylenic unsaturation conjugated therewith, with at least one mol of an aliphatic monocarbothiolic acid per ethylenic double bond in said aliphatic oxo compound, maintaining the mixture at a temperature within the range of 30° C. to 100° C. until the reaction is substantially completed, and isolating the beta (acylthio) oxo compound produced thereby.

WILLIAM H. VINTON.

REFERENCES CITED

The following references are of record in the file of this patent:

UNITED STATES PATENTS

| Number | Name | Date |
| --- | --- | --- |
| 1,869,862 | Orthner | Aug. 2, 1932 |
| 1,924,566 | Orthner | Aug. 29, 1933 |
| 2,050,190 | Lichty | Aug. 4, 1936 |
| 2,084,038 | Lichty | June 15, 1937 |
| 2,197,570 | Lichty | Apr. 16, 1940 |
| 2,205,100 | Lichty | June 18, 1940 |
| 2,234,031 | Wenning | Mar. 4, 1941 |
| 2,351,366 | Pohl | June 13, 1944 |

OTHER REFERENCES

Van Wacek, Chemical Abstracts, vol. 37, pp. 4710–4711 (1943).

Holmberg, Chemical Abstracts, vol. 35, pp. 2113–2114 (1941).

Sjanberg, Chemical Abstracts, vol. 36, p. 1902 (1942).